United States Patent
Wong et al.

(10) Patent No.: US 11,533,710 B2
(45) Date of Patent: Dec. 20, 2022

(54) METHOD AND DEVICE FOR PAGING A MACHINE TO MACHINE DEVICE

(71) Applicant: Sony Group Corporation, Tokyo (JP)

(72) Inventors: Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 81 days.

(21) Appl. No.: 17/220,944

(22) Filed: Apr. 2, 2021

(65) Prior Publication Data
US 2021/0227497 A1 Jul. 22, 2021

Related U.S. Application Data

(63) Continuation of application No. 16/791,780, filed on Feb. 14, 2020, now Pat. No. 10,973,002, which is a (Continued)

(30) Foreign Application Priority Data

Apr. 5, 2016 (EP) .................................... 16163933

(51) Int. Cl.
*H04W 68/02* (2009.01)
*H04W 4/70* (2018.01)
(Continued)

(52) U.S. Cl.
CPC ............. *H04W 68/02* (2013.01); *H04W 4/70* (2018.02); *H04W 68/00* (2013.01);
(Continued)

(58) Field of Classification Search
CPC ... H04W 48/12; H04W 68/02; H04W 72/042; H04W 68/005; H04W 74/0833;
(Continued)

(56) References Cited

U.S. PATENT DOCUMENTS

2013/0194998 A1  8/2013  Susitaival et al.
2013/0301501 A1* 11/2013  Olvera-Hernandez .....................
                                        H04W 52/0216
                                                  370/311
(Continued)

FOREIGN PATENT DOCUMENTS

EP          2999280 A2     3/2016

OTHER PUBLICATIONS

Remaining issues on NB-PDCCH Design of NB-IoT, 3GPP TSG RAN WG1 Meeting #84, pp. 1-9, (Feb. 15-19, 2016).
(Continued)

*Primary Examiner* — Kwasi Karikari
(74) *Attorney, Agent, or Firm* — Xsensus LLP

(57) ABSTRACT

A terminal device for use with a wireless telecommunications network, the terminal device including a transceiver, and a controller configured to control the transceiver to begin receiving, during one of a plurality of periodic paging occasions associated with the terminal device, a scheduling signal scheduling a paging message for paging one or more terminal devices of the wireless telecommunications network, and determine whether a value of a characteristic of the received scheduling signal matches a value of a characteristic of a scheduling signal associated with the one of the plurality of periodic paging occasions associated with the terminal device.

15 Claims, 10 Drawing Sheets

Related U.S. Application Data continuation of application No. 16/091,273, filed as application No. PCT/EP2017/057758 on Mar. 31, 2017, now Pat. No. 15,568,067.

(51) Int. Cl.
  *H04W 68/00* (2009.01)
  *H04W 72/12* (2009.01)
  *H04W 4/33* (2018.01)

(52) U.S. Cl.
  CPC .......... *H04W 72/1289* (2013.01); *H04W 4/33* (2018.02); *H04W 68/005* (2013.01)

(58) Field of Classification Search
  CPC . H04W 88/02; H04W 76/28; H04W 72/1289; H04W 48/10; H04W 52/0216; H04W 4/06; H04W 48/20; H04W 74/004; H04W 76/10; H04W 76/19
  See application file for complete search history.

(56) References Cited

U.S. PATENT DOCUMENTS

| | | | |
|---|---|---|---|
| 2014/0162705 A1* | 6/2014 | De Wit | H04W 68/02 455/458 |
| 2017/0273078 A1 | 9/2017 | Rico Alvarino et al. | |

OTHER PUBLICATIONS

"Paging and DRX in Idle mode in NB-IoT", 3GPP TSG-RAN2 Meeting #93, pp. 1-6, (Feb. 15-19, 2016).
"Physical channels for paging in NB-IoT", 3GPP TSG-RAN WG2 Meeting NB-IoT ad-hoc, pp. 1-10, (Jan. 19-21, 2016).
"Remaining open aspects on NBIOT Paging", 3GPP TSG RAN WG2 NB-Iot Ad Hoc, pp. 1-4, (Jan. 19-21, 2016).
"Issues for PF/PO in NB-Iot", 3GPP TSG-RAN WG2 NB-IoT AH, pp. 1-5, (Jan. 19-21, 2016).
"Paging procedure for NB-IoT", 3GPP TSG-RAN WG2 #NB-Iot adhoc, Release 13, pp. 1-3, (Jan. 19-21, 2016).
"Discussion and decision", 3GPP TSG-RAN WG1 NB-Iot Ad Hoc, pp. 1-11 (Jan. 18-20, 2016).
"Way Forward on NB-IoT", 3GPP TSG RAN WG1 #83, pp. 1-3. (Nov. 15-22, 2015).
Holma, H. and Toskala, A., "LTE for UMTS—OFDMA and SC-FDMA Based Radio Access", pp. 25-27 (2009).
"New Work Item: NarrowBand Iot NB-Iot", 3GPP TSG RAN Meeting #69 pp. 1-9, (Sep. 14-16, 2015).
International Search report for International Application No. PCT/EP2017/057758, dated Jul. 20, 2017.
Taiwanese Office Action and Search Report dated Sep. 21, 2018 in Taiwan Application No. 106107628.

\* cited by examiner

METHOD AND DEVICE FOR PAGING A MACHINE TO MACHINE DEVICE

CROSS REFERENCE TO RELATED APPLICATIONS

The present application is a continuation of U.S. application Ser. No. 16/791,780, filed Feb. 14, 2020, which is a continuation of U.S. application Ser. No. 16/091,273, filed Oct. 4, 2018, which is a National Phase of PCT/EP2017/057758 filed Mar. 31, 2017, and claims priority to European Patent Application No. 16163933.1, filed Apr. 5, 2016. The entire contents of each of which are incorporated herein by reference.

BACKGROUND

Field of Disclosure

The present disclosure relates to a terminal device, infrastructure equipment, methods and integrated circuitry for use with a wireless telecommunications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation project partnership (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

According to a first embodiment, the present technique provides a terminal device for use with a wireless telecommunications network, the terminal device comprising: a transceiver; and a controller operable: to control the transceiver to begin receiving, during one of a plurality of periodic paging occasions associated with the terminal device, a scheduling signal scheduling a paging message for paging one or more terminal devices of the wireless telecommunications network, each periodic paging occasion associated with the terminal device being associated with a value of a characteristic of the scheduling signal which is different from a value of the characteristic of the scheduling signal associated with one or more of each of the other periodic paging occasions associated with the terminal device and each of periodic paging occasions associated with one or more other terminal devices of the wireless telecommunications network; to determine whether the value of the characteristic of the received scheduling signal matches the value of the characteristic of the scheduling signal associated with the one of the plurality of periodic paging occasions associated with the terminal device; and if the value of the characteristic of the received scheduling signal matches the value of the characteristic of the scheduling signal associated with the one of the plurality of periodic paging occasions associated with the terminal device, to control the transceiver to receive the paging message scheduled by the received scheduling message.

According to the first embodiment, the present technique also provides infrastructure equipment for use with a wireless telecommunications network, the infrastructure equipment comprising: a transceiver; and a controller operable: to control the transceiver to begin transmitting, during one of a plurality of periodic paging occasions associated with a terminal device of the wireless telecommunications network, a scheduling signal scheduling a paging message for paging the terminal device, wherein a value of a characteristic of the scheduling signal is associated with the one of the plurality of periodic paging occasions associated with the terminal device, each periodic paging occasion associated with the terminal device being associated with a value of the characteristic of the scheduling signal which is different from a value of the characteristic of the scheduling signal associated with one or more of each of the other periodic paging occasions associated with the terminal device and each of periodic paging occasions associated with one or more other terminal devices of the wireless telecommunications network.

According to a second embodiment, the present technique provides a terminal device for use with a wireless telecommunications network, the terminal device comprising: a transceiver; and a controller operable: to control the transceiver to begin receiving, during one of a plurality of periodic paging occasions associated with the terminal device, a scheduling signal scheduling a paging message for paging the terminal device; wherein the scheduling signal is repeatedly transmitted by the network a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver is controlled to begin receiving the scheduling signal; and the controller is operable to control the transceiver to receive the repetitions of the scheduling signal over the predetermined plurality of separate time periods.

According to the second embodiment, the present technique also provides infrastructure equipment for use with a wireless telecommunications network, the infrastructure equipment comprising: a transceiver; and a controller operable: to control the transceiver to begin transmitting, during one of a plurality of periodic paging occasions associated with a terminal device of the wireless telecommunications network, a scheduling signal scheduling a paging message for paging the terminal device; wherein the controller is operable to control the transceiver to repeatedly transmit the scheduling signal a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver is controlled to begin transmitting the scheduling signal.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
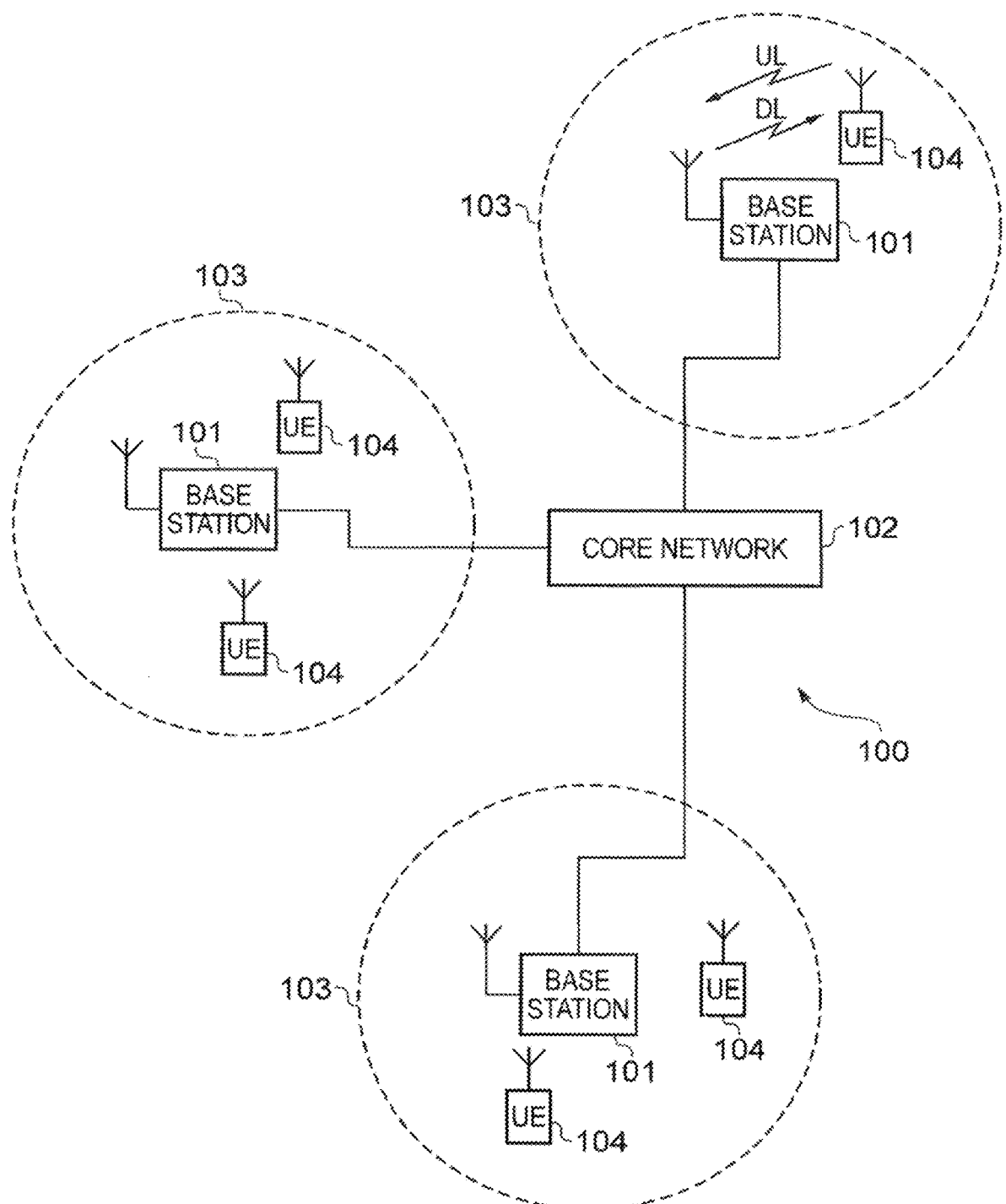
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, terminal device and so forth. Base stations may also be referred to as transceiver stations/infrastructure equipment/ NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
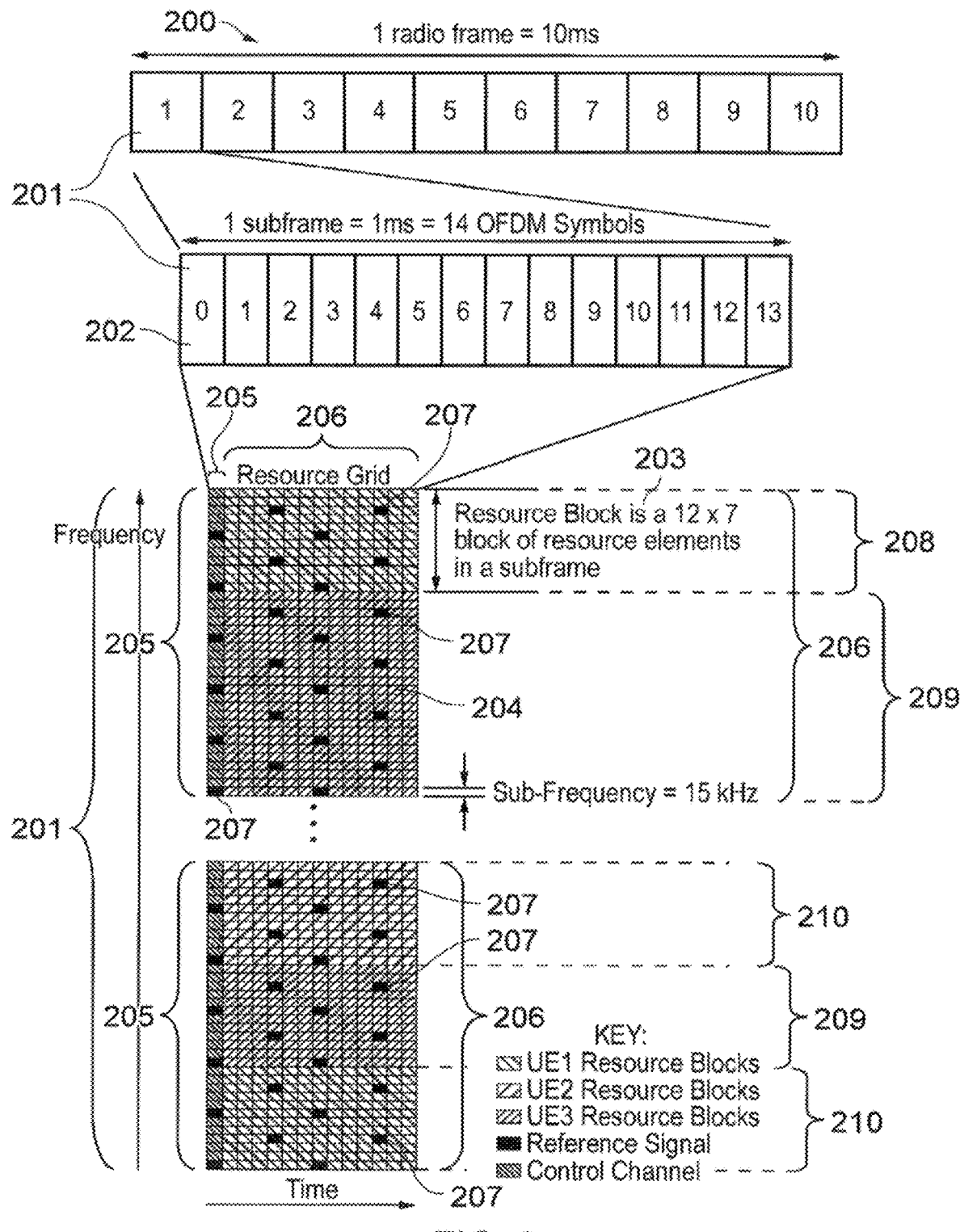
FIG. 2 is a schematic representation illustrating a frame structure of a downlink of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into 128 to 2048 orthogonal subcarriers for example. Each subcarrier bandwidth may take any value but in LTE it is conventionally fixed at 15 kHz. However it has been proposed in the future [2][3] to provide also a reduced subcarrier spacing of 3.75 kHz for certain parts of the LTE wireless access interface for the uplink. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the downlink structure of the LTE wireless access interface are provided in Annex 1.

Figure 3:
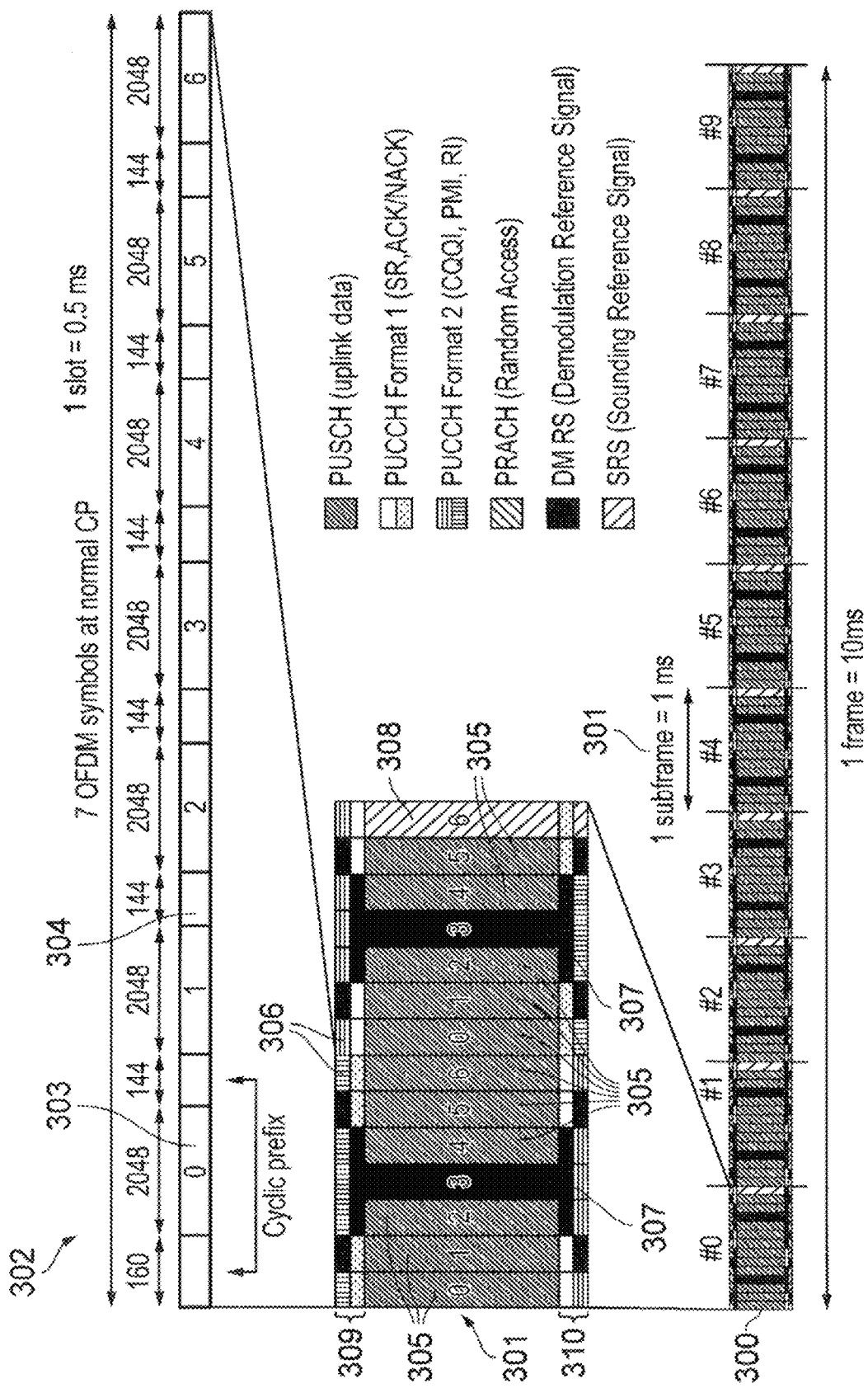
FIG. 3 is a schematic representation illustrating a frame structure of an uplink of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE uplink represented in FIG. 3 are provided in Annex 1.

Narrowband Internet of Things

Figure 4:
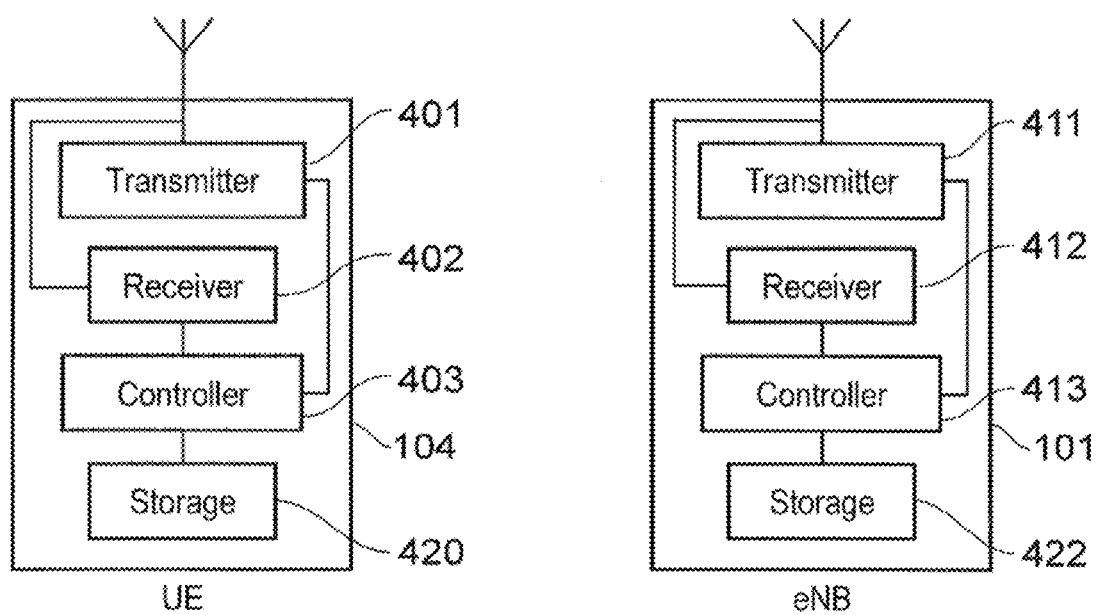
FIG. 4 is a schematic representation of a terminal device and infrastructure equipment.

As explained above, it has been proposed to develop an adaptation of a mobile communications network to accommodate narrow band communications within an existing wireless access interface which has been developed to provide broadband wireless communications. For example, in 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilizing for example the spectrum currently being used by GERAN systems as a replacement of one or more GSM carriers
2. 'Guard band operation' utilizing the unused resource blocks within a LTE carrier's guard-band
3. 'In-band operation' utilizing resource blocks within a normal LTE carrier FIG. 4 provides an example schematic block diagram of a terminal device or UE 104 and an infrastructure equipment or eNB 101 according to embodiments of the present technique. As shown in FIG. 4, the UE 104 includes a transmitter 401 and a receiver 402 (which together form a transceiver) which are controlled by a controller 403. The UE 104 also comprises a storage medium 420 for storing data. Correspondingly, the eNB 101 includes a transmitter 411 and a receiver 412 (which together form a transceiver) which are controlled by a controller 413 (which can also implement a scheduler function). The eNB 101 also comprises a storage medium 422 for storing data. As explained above, the UE 104 transmits and receives signals to and from the eNB 101 via a wireless access interface provided by the eNB as part of the wireless communications network. Each of the UE 104 and eNB 101 are configured to exchange signals with each other using NB-IoT.

One of the objectives of NB-IoT is to provide extended coverage of up to 20 dB. The main mechanism to extend coverage is to perform numerous repetitions of a message to be received at a receiving device, such that the receiver can accumulate the signal energy over the repetitive samples in order for it to have an increased signal-to-noise ratio (SNR), which increases the likelihood of successful decoding of the message at the receiving device. Such a mechanism is known as coverage enhancement (CE).

Coverage enhancement (CE) may have several levels. For example, it may provide one of 5 dB, 15 dB and 20 dB additional coverage enhancement. In NB-IoT, the CE levels may be referred to as the targeted MCL (Max Coupling Loss, the achievable coupling loss (accounting for, for example, path loss, feeder losses and/or antenna gains) between transmitter and receiver) of, for example, 144 dB, 154 dB and 164 dB (so that the higher the targeted MCL, the greater the additional coverage enhancement).

As previously mentioned, repetitions of a signal so that a receiver can accumulate energy of the signal over numerous repetitive samples is the basic method used for coverage enhancement. The number of repetitions required is dependent upon the CE level. Thus, a UE at a lower CE level, such as at 144 dB, MCL requires less repetition compared to one at a higher CE level, such as at 154 dB MCL. The power spectral density, PSD (mW/Hz) of a transmission also affects the number of repetitions required, that is, the larger the PSD, the less the required number of repetitions.

The NB-PDCCH (Narrow Band Physical Downlink Control Channel) is a control channel that is used to schedule downlink resources (downlink grant) and uplink resources (uplink grant) for a NB-PDSCH (Narrow Band Physical Downlink Shared Channel) and a NB-PUSCH (Narrow Band Physical Uplink Shared Channel) that carry data traffic. An NB-PDCCH search space consists of multiple NB-PDCCH candidates wherein each candidate has a specific starting time, set of subcarriers, a defined number of repetitions and an aggregation level (the aggregation level relating to the number of frequency resources occupied by the candidate such that when the candidate occupies a higher number of frequency resources, the aggregation level is higher, and when the candidate occupies a lower number of frequency resources, the aggregation level is lower). Candidates that have a larger number of repetitions and a higher aggregation level are more robust and can reach a UE at poorer coverage compared to candidates that have a smaller number of repetitions and a lower aggregation level.

Figure 5:
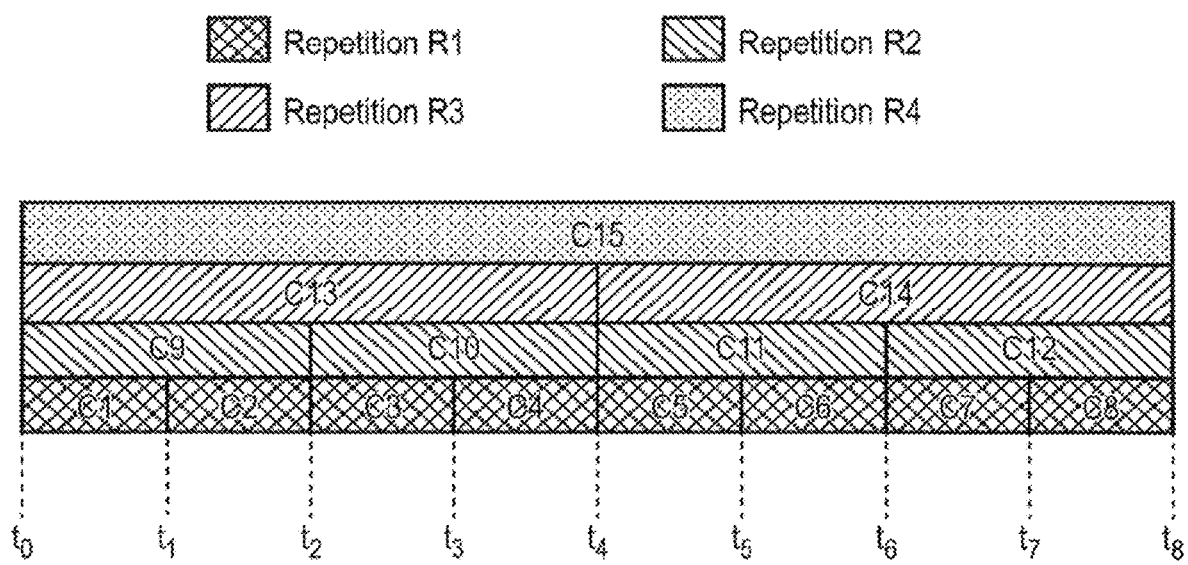
FIG. 5 is a schematic representation of an NB-PDCCH search space.

The eNB uses one of the candidates in the search space to carry the NB-PDCCH. The UE is not aware which candidate is used and so it must blind decode all the candidates in the search space in order to find the candidate used by the eNB for the NB-PDCCH. An example of a typical NB-PDCCH search space is shown in FIG. 5. Here, the search space has 4 repetition levels {R1, R2, R3, R4} where R4=2×R3=4× R2=8×R1. It should be appreciated that an NB-PDCCH search space with other repetition levels is also possible. As an example the eNB can use any of the 15 candidates (labelled as C1 to C15) to carry the NB-PDCCH and the UE has to blind decode for all 15 candidates. The max repetition $R_{MAX}$ (in FIG. 5, $R_{MAX}$=R4) of the search space is assigned to the UE based on the UE's radio condition. Thus, for example, if the UE is in a poorer quality radio coverage location, then the eNB can configure a search space with a larger value of $R_{MAX}$, and if the UE is in a better quality radio coverage location, then the eNB can configure a search space with a smaller value of $R_{MAX}$. Typically, a set of NB-PDCCH search spaces is predefined in which each NB-PDCCH search space of the set consists of a set of candidates and a value of $R_{MAX}$. The UE is then assigned one NB-PDCCH search space in the set of NB-PDCCH search spaces. The maximum repetition $R_{MAX}$ of an NB-PDCCH search space can be selected from the set of values {1, 2, 4, 8, 16, 32, 64, 128, 256, 512, 1024, 2048}, for example.

Figure 6:
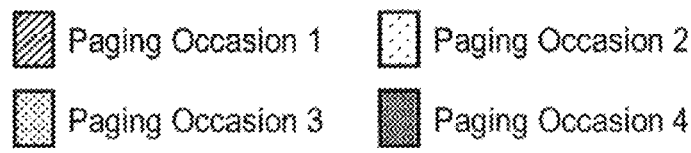
FIG. 6 is a schematic representation of a plurality of paging occasions during which groups of UEs may search the NB-PDCCH search space.
Figure 6:
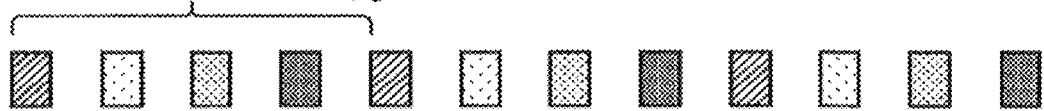

In NB-IoT, paging is performed when a UE is in idle mode. More specifically, when in idle mode, the UE monitors an NB-PDCCH CSS (Common Search Space) which, in the case that a paging message is to be transmitted to the UE, contains an NB-PDCCH that schedules that paging message (the paging message being carried by an NB-PDSCH). In order to reduce power consumption, the UE monitors the NB-PDCCH CSS during each of a plurality of periodic Paging Occasions (PO) rather than constantly monitoring the NB-PDCCH CCS. The PO occurs periodically for a particular UE (or particular group of UEs), wherein the period is configured by the network, for example. In an embodiment, the network can configure multiple POs in which the specific PO that a UE monitors depends on an identifier of that that UE (UE-ID), for example, the UE's International Mobile Subscriber Identifity (IMSI). This enables the network to spread the paging load. For example in FIG. 6, the eNB configures four POs where each PO has a period $T_{PO}$. The UE thus wakes up every $T_{PO}$ ms to monitor for possible paging. The PO is assigned to the UE based on the UE's ID, using a MOD function of the number of POs, for example (thus, in the case of FIG. 6, the PO assigned to a particular UE is given by UE_ID MOD 4).

Figure 7:
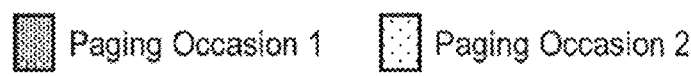
FIG. 7 is a schematic representation of an NB-PDCCH search space overlapping paging occasions associated with separate groups of UEs.
Figure 7:
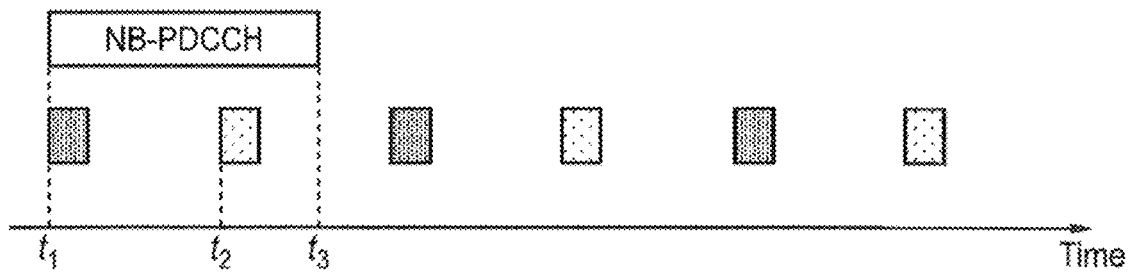

As described previously, repetition of the paging CSS can reach 2048. A problem with this is that a PO can overlap another PO, causing confusion for UEs reading the PO. For example in FIG. 7, two POs are configured. PO 1 begins at time $t_1$, where UE 1 belonging to this PO will start monitoring for NB-PDCCH in the paging CSS. This paging CSS ends at time $t_3$. If the repetition of NB-PDCCH is very long (for example, if the paging CSS ending at time $t_3$ has the structure shown in FIG. 5, and the NB-PDDCH is received via the candidate C15 with the largest number of repetitions), it will overlap into PO 2 at time $t_2$. At time $t_2$ UE 2 belonging to PO 2 will start monitoring for NB-PDCCH and will start to accumulate repetition samples from the NB-PDCCH intended for UE 1 (belong to PO 1). If UE 2 is in a better radio condition than UE 1, it may decode the NB-PDCCH and start to accumulate and decode the corresponding NB-PDSCH containing the paging message. UE 2 will not find any paging indication in this paging message and would waste battery power accumulating and decoding the NB-PDSCH. This is because the paging message contains an identifier of each UE to be paged. If a paging message is not intended for UE 2, then the identifier of UE 2 will not be included in the paging message and thus UE 2 will not be paged. However, since UE 2 has received the NB-PDCCH during its paging occasion, it will still attempt to read the paging message scheduled by the NB-PDCCH by accumulating and decoding the NB-PDSCH, thus wasting battery power. It should be noted that the NB-PDSCH is also repeated.

Figure 8:
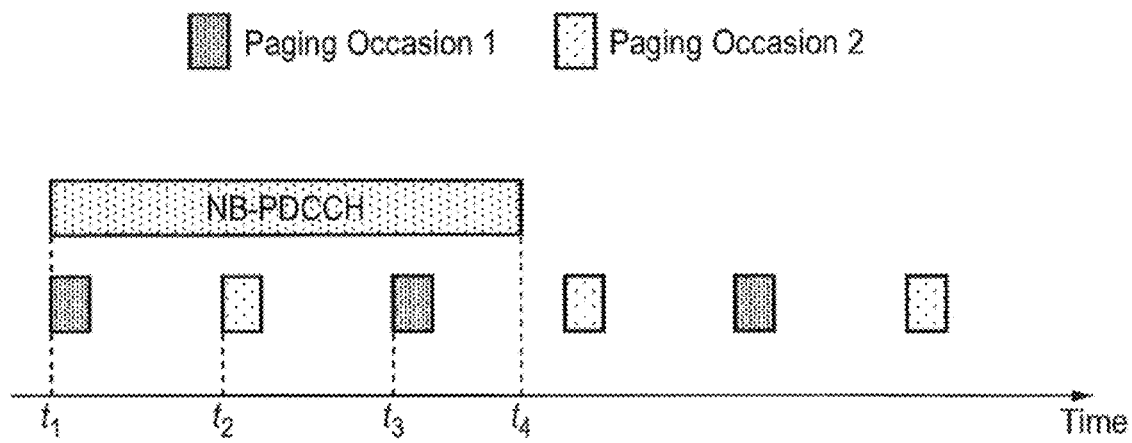
FIG. 8 is a schematic representation an NB-PDCCH search space overlapping paging occasions associated with the same group of UEs.

It should also be appreciated that if the PO period $T_{PO}$ is shorter than the NB-PDCCH repetition, the PO may overlap itself, as shown in an example in FIG. 8, in which the NB-PDCCH for PO 1 starts at time $t_1$ but the repetition doesn't end till time $t_4$. It overlaps the next PO 1 at time $t_3$. In this scenario, the UE belonging to PO 1 is confused as to whether to continue accumulating samples from the previous PO 1 (started at time $t_1$) or start a new accumulation starting at time $t_3$. Furthermore, in an embodiment, the NB-PDSCH starting subframe is indicated in the downlink control information (DCI) of the NB-PDCCH, this NB-PDSCH starting subframe being defined relative to the end of the NB-PDCCH that schedules this NB-PDSCH. In order to determine the end of an NB-PDCCH transmission, the repetition of the NB-PDCCH is indicated in the DCI of that NB-PDCCH. For example, in FIG. 5, if candidate C11 is used to carry the NB-PDCCH (including the DCI), then the NB-PDSCH scheduled by the NB-PDCCH will start at k subframes after time $t_6$ ($t_6$ marking the end of the NB-PDCCH carried by candidate C11) where k is indicated in the DCI. Since the UE can decode a message with less repetition when it has a good radio condition, however, the UE may decode C11 at time is and mistake candidate C11 for candidate C5. The UE will thereby use the wrong reference point for the start of the NB-PDSCH. To avoid this, the repetition of the NB-PDCCH is indicated in the DCI so that the UE will not mistake candidate C11 for C5. However, this does not solve the problem shown in FIG. 8 in which the search space overlaps itself. In this case, although the UE will know the repetition of the NB-PDCCH from the DCI information, the UE does not know whether the NP-PDCCH repetitions started at time $t_1$ or at time $t_3$. This causes confusion at the UE regarding the candidates.

In LTE Release-13 eMTC (enhanced Machine Type Communication), the POs are separated far apart so that they do not overlap. This is possible because the repetition used in this case is not as large as that used in NB-IoT. Furthermore, eMTC can use different narrowbands for different groups of UEs and avoid overlapping. In contrast, only the anchor NB-IoT can contain the paging CSS and paging message, and therefore problem of overlapping of the NB-PDCCH between different POs requires a new solution.

In an embodiment of the present technique, an indicator is used to distinguish one PO from another. The UE belonging to a PO then uses this indicator to determine whether the NB-PDCCH belongs to it or to another PO.

In one embodiment, the said indicator is a PO index in the DCI (carried by the NB-PDCCH). A new field in the DCI would indicate which PO the DCI (that is, the NB-PDCCH) belongs to. The UE, after accumulating the NB-PDCCH, will then decode the DCI and check the PO index to see whether it matches the PO that the UE belongs to.

In another embodiment, different versions of the same PO are also indicated in the DCI. This is to help overcome the issue of uncertainty at the UE regarding when the search space starts when a NB-PDCCH repetition is larger than the PO period $T_{PO}$ (as described in FIG. 8). For example, in FIG. 8, PO 1 at time $t_1$ can be version 1 and PO 1 at time $t_3$ can be version 2, these versions being distinguishable from each other by the PO identifier in the DCI so the UE is clear where the search space starts. This helps to avoid confusion of the candidates in the search space.

In another embodiment the starting time of the CSS is indicated in the DCI. This is similar to indicating the PO index (which indirectly indicates the starting time of the CSS). After decoding the DCI, the UE will determine whether the starting time of the decoded NB-PDCCH belongs to the CSS that starts at its PO or another PO. If the CSS starts at a time belonging to another PO, the UE can discard the decoded DCI.

In another embodiment, a different P-RNTI (Paging Radio Network Temporary Identifier) is used for one or more of each respective PO and each respective PO version. The P-RNTI of each respective PO and/or each respective PO version can be signalled either explicitly or implicitly (that is, derived from a reference P-RNTI). For example, in the case that a different P-RNTI is used for each respective PO, the eNB may signal a single reference P-RNTI and PO 1 will use this P-RNTI, PO 2 will use this reference P-RNTI+1, PO 3 will use P-RNTI+2, and so on.

In another embodiment, a scrambling applied to the NB-PDCCH is dependent upon the PO. The UE then applies a descrambler depending upon which PO it belongs to. A different scrambling may be applied to each respective PO (so as to distinguish, for example, PO 1 from PO 2, but not distinguish between different versions of PO 1 or PO 2). Alternatively, or in addition, a different scrambling may be applied to each respective PO version (so that different versions of, for example, PO 1 or PO 2 may be distinguished from each other).

It will be appreciated that various features of these embodiments may be combined as appropriate. For example, it may be the case that each respective PO is distinguished by a different scrambling, but then each version of that PO is further distinguished in the DCI.

Figure 9:
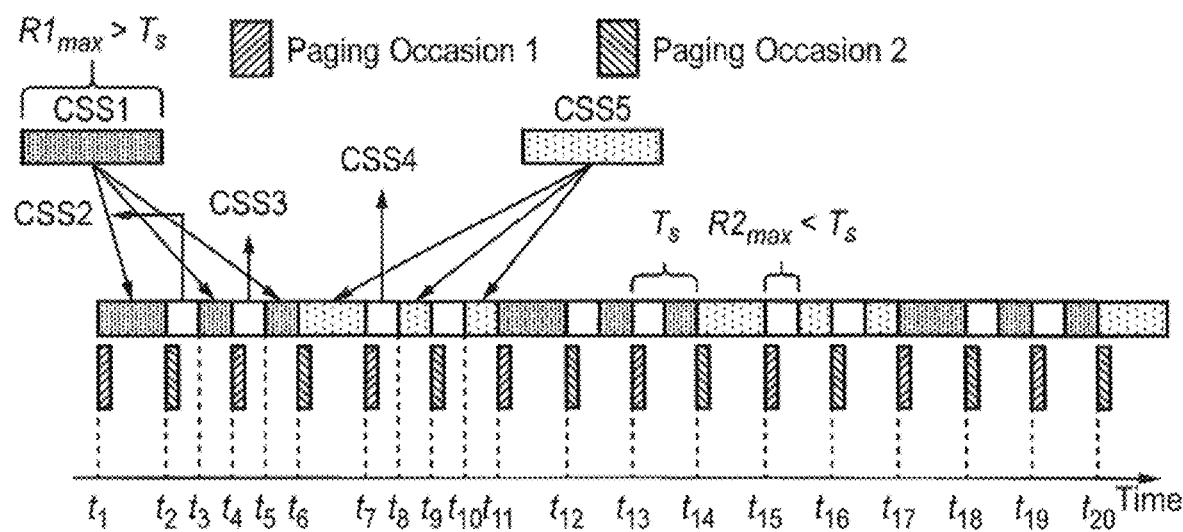
FIG. 9 is a schematic representation of segmentation of the NB-PDCCH according to a first example.
Figure 10:
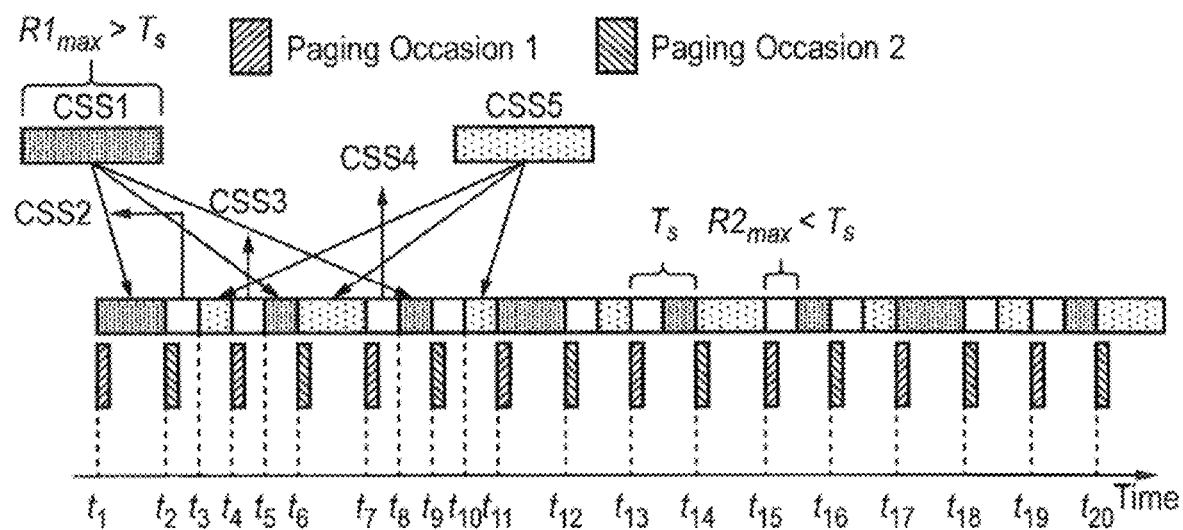
FIG. 10 is a schematic representation of segmentation of the NB-PDCCH according to a second example.

In another embodiment of the present technique, two or more different NB-PDCCH search spaces (that is, Common Search Spaces) are configured wherein at least one of these search spaces has max repetition $R1_{MAX}$ greater than the time between two adjacent POs $T_S$ (thus potentially causing the overlapping issue described in FIG. 7) whilst the remaining search spaces have max repetition $R2_{MAX}$ smaller than $T_S$. In this way the search space with $R1_{MAX}$ can be segmented and interleaved with search spaces with $R2_{MAX}$. An example is shown in FIG. 9, where each PO is associated with one of two types of NB-PDCCH Common Search Space (CSS) with $R1_{MAX}$ and $R2_{MAX}$, respectively. CSS1 belongs to PO1, starts at time $t_1$ and has a max repetition of $R1_{MAX}$ where $R1_{MAX}>T_S$, (meaning that, if measures are not taken, then CSS1 will overlap with the adjacent PO (that is, PO2)). Using the method of an embodiment, CSS1 (belonging to the first version of PO1) is segmented into 3 segments, wherein the 1st segment starts at time $t_1$ and ends at time $t_2$. The 2nd segment occupies the time $t_3$ to $t_4$, which avoids overlapping CSS2 (belonging to the first version of PO2) between time $t_2$ and $t_3$. The 3rd segment occupies time $t_5$ to $t_6$, which avoids overlapping CSS3 (belonging to the second version of PO1) between time $t_4$ and $t_5$. The segments of CSS1 are therefore interleaved with CSS2 and CSS3. CSS3 and CSS4 belong to PO1 (the second and third versions of PO1, respectively) but with a smaller maximum repetition, that is, $R2_{MAX}<T_S$, and therefore do not overlap with any adjacent PO. CSS3 and CSS4 are thus not segmented. CSS5 belongs to PO2 (in particular, the second version of PO2), and since its max repetition is greater that $T_S$, it is segmented and interleaved in a similar manner as that for CSS1. The example in FIG. 9 shows two types of CSS (that is, with two different max repetition values). However, it should be appreciated this method is also applicable for more than two different max repetition CSSs. Also, the segments of CSS1 can be interleaved using a different pattern, for example, interleaved with different CSSs such as CSS3 and CSS4 (as shown in FIG. 10).

In an embodiment, different POs have different max CSS repetitions. For example, the CSS for PO1 may have repetition $R1_{MAX}>T_S$ whilst the CSS for PO2 may have max repetition $R2_{MAX}<T_S$. In this embodiment, the CSS for PO1 is segmented and interleaved with the un-segmented CSS for PO2.

Figure 11:
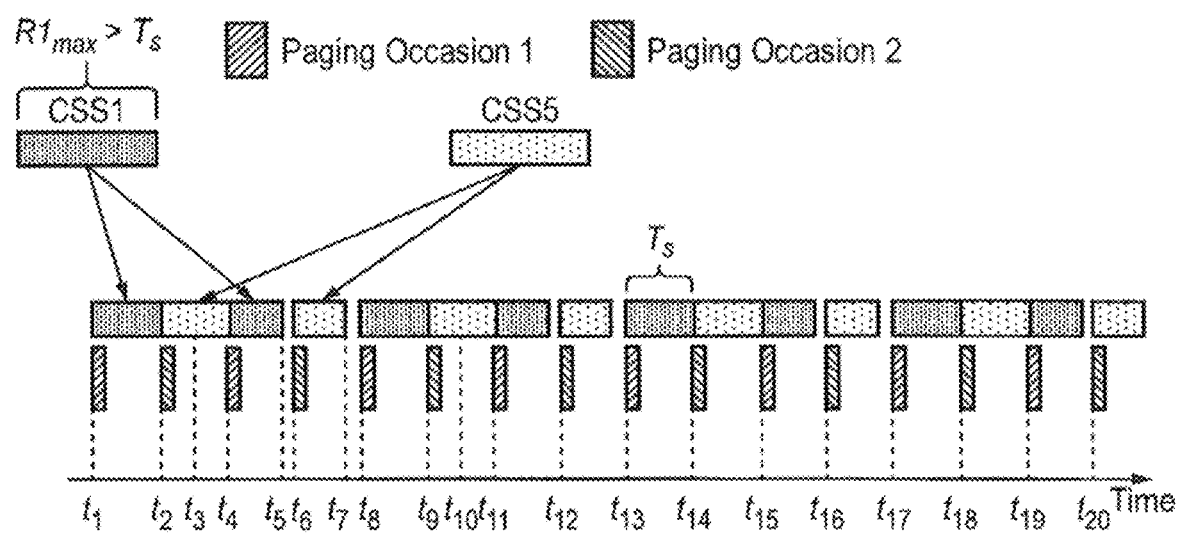
FIG. 11 is a schematic representation of segmentation of the NB-PDCCH according to a third example.

In another embodiment, all CSSs have $R1_{MAX}>T_S$. Each CSS (with $R1_{MAX}$) is segmented and the segment occupies multiple POs. That is, the CSS is spread among multiple POs. An example is shown in FIG. 11, where CSS1 (belonging to PO1) has $R1_{MAX}>T_S$ and is segmented into two segments. The first segment occupies time $t_1$ to $t_2$ and the 2nd segment occupies time $t_4$ to $t_5$. Similarly, CSS5 (belonging to PO2) has $R1_{MAX}>T_S$ and is segmented into two segments. The first segment occupies time $t_2$ to $t_3$ and the 2nd segment occupies time $t_6$ to $t_7$. It should be noted that the 2nd segment length of each of CSS1 and CSS2 is less than $T_S$ in this example.

In another embodiment, the overlapping problem shown in FIG. 8 can be overcome by ensuring the Paging Occasion period $T_{PO}>R1_{MAX}$. Note that this is easier to achieve than to ensure that $T_S>R1_{MAX}$, since $T_{PO}$ can be much larger than $T_S$ (for example, up to 2560 subframes) and multiple different POs may fit within the $T_{PO}$.

In embodiments, the segments of the NB-PDCCH search space can be defined by a predetermined pattern, this pattern being configured by the network and, for example, transmitted to the UE 104 from the eNB 101 as system information (in the System Information Block (SIB), for example). In an embodiment, the pattern may vary depending on the number of repeats of the NB-PDCCH, an identifier of the CSS which is used, or any other parameter which the UE may discern from the CSS or NB-PDCCH. The relationship between the predetermined pattern and the CSS or NB-PDCCH may be determined and transmitted to the UE 104 by the eNB 101 and may be in the form of a lookup table of the like. In another embodiment, the pattern may be fixed for the set of paging occasions associated with the UE (again, information indicative of this fixed pattern may be determined and transmitted to the UE 104 by the eNB 101).

It will thus be appreciated that, in a first embodiment, the present technique provides a terminal device 104 for use with a wireless telecommunications network. The terminal device comprises a transceiver 401, 402 and a controller 403. The controller is operable to control the transceiver to begin receiving, during one of a plurality of periodic paging occasions associated with the terminal device (for example, the plurality of periodic paging occasions PO1 or PO2), a scheduling signal (carried by the NB-PDCCH, for example) scheduling a paging message for paging one or more terminal devices of the wireless telecommunications network. Each periodic paging occasion associated with the terminal device is associated with a value of a characteristic of the scheduling signal which is different from a value of the characteristic of the scheduling signal associated with one or more of each of the other periodic paging occasions associated with the terminal device and each of periodic paging occasions associated with one or more other terminal devices of the wireless telecommunications network. The controller is operable to determine whether the value of the characteristic of the received scheduling signal matches the value of the characteristic of the scheduling signal associated with the one of the plurality of periodic paging occasions associated with the terminal device, and, if the value of the characteristic of the received scheduling signal matches the value of the characteristic of the scheduling signal associated with the one of the plurality of periodic paging occasions associated with the terminal device, to control the transceiver to receive the paging message scheduled by the received scheduling message.

In one example, the characteristic of the scheduling signal is a paging occasion identifier identified by the scheduling signal. All periodic paging occasions associated with the terminal device may be associated with the same identifier of the scheduling signal (thus, for example, each paging occasion in the plurality of paging occasions PO1 may have the same index, each paging occasion in the plurality of paging occasions PO2 may have the same index, and so on). Alternatively, each periodic paging occasion associated with the terminal device may be associated with an identifier of the scheduling signal which is different from the identifier of the scheduling signal associated with each of the other periodic paging occasions associated with the terminal device (thus, for example, each paging occasion in the plurality of paging occasions PO1 may have a version number which distinguishes it from the other paging occasions in the plurality PO1, each paging occasion in the plurality of paging occasions PO2 may have a version number which distinguishes it from the other paging occasions in the plurality PO1, and so on). Any suitable identifier may be used as the paging occasion identifier, including, for example, an identifier comprising one or more of a PO index, PO version number or P-RNTI number, as previously discussed.

In another example, the characteristic of the scheduling signal is a scrambling of the scheduling signal. All periodic paging occasions associated with the terminal device may be associated with the same scrambling of the scheduling signal (thus, for example, each paging occasion in the plurality of paging occasions PO1 may be associated with the same scrambling of the scheduling signal, each paging occasion in the plurality of paging occasions PO2 may be associated with the same scrambling of the scheduling signal, and so on). Alternatively, each periodic paging occasion associated with the terminal device may be associated with a scrambling of the scheduling signal which is different from the scrambling of the scheduling signal associated with each of the other periodic paging occasions associated with the terminal device (thus, for example, each paging occasion in the plurality of paging occasions PO1 may be associated with a different scrambling of the scheduling signal to the scrambling of the scheduling signal associated with the other paging occasions in the plurality PO1, each paging occasion in the plurality of paging occasions PO2 may be associated with a different scrambling of the scheduling signal to the scrambling of the scheduling signal associated with the other paging occasions in the plurality PO2, and so on).

In another example, the scheduling signal is transmitted using a candidate of a radio search space, the radio search space being defined by a plurality of candidates and each candidate of the radio search space being defined by a set of time and/or frequency radio resources for use in repeatedly transmitting the scheduling signal a number of times associated with that candidate, and the controller is operable to control the transceiver to attempt to receive the scheduling signal from each candidate of the radio search space. For example, the radio search space may be a CSS and the scheduling signal may be the repeatedly transmitted NB-PDCCH. In this case the characteristic of the scheduling signal is a starting time of the radio search space indicated by the scheduling signal, and the controller is operable to determine, on the basis of the starting time of the radio search space and a starting time of the scheduling signal, whether the scheduling signal belongs to a radio search space with a starting time which matches the starting time of the one of the plurality of periodic paging occasions associated with the terminal device, wherein the controller determines a match when the scheduling signal is determined to belong to a radio search space with a starting time which matches the starting time of the one of the plurality of periodic paging occasions associated with the terminal device.

In this first embodiment, the present technique also provides infrastructure equipment 101 for use with a wireless telecommunications network. The infrastructure equipment comprises a transceiver 411, 412 and a controller 413. The controller is operable to control the transceiver to begin transmitting, during the one of the plurality of periodic paging occasions associated with the terminal device 104, the scheduling signal scheduling the paging message for paging the terminal device in the way as described.

It will also be appreciated that, in a second embodiment, the present technique provides a terminal device 101 for use with a wireless telecommunications network. The terminal device comprises a transceiver 401, 402 and a controller 403. The controller is operable to control the transceiver to begin receiving, during one of a plurality of periodic paging occasions associated with the terminal device (for example, the plurality of periodic paging occasions PO1 or PO2), a scheduling signal (carried by the NB-PDCCH, for example) scheduling a paging message for paging the terminal device. The scheduling signal is repeatedly transmitted by the network a predetermined number of times over a predetermined plurality of separate time periods (in other words, the periodic repeats of the scheduling signal are segmented, as shown in FIGS. 9 to 11, for example), each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver is controlled to begin receiving the scheduling signal. The controller is operable to control the transceiver to receive the repetitions of the scheduling signal over the predetermined plurality of separate time periods.

In one example, the total time taken for the scheduling signal to be repeatedly transmitted by the network is greater than the time period between consecutive periodic paging occasions associated with the terminal device and with any other terminal device of the wireless telecommunications network with which a plurality of periodic paging occasions is associated. Scheduling signals with a duration of that of CSS1 or CSS 5 (shown in FIGS. 9 to 11) are examples of such scheduling signals.

In one example, the plurality of periodic paging occasions associated with the terminal device are interleaved with the plurality of periodic paging occasions associated with any other terminal device of the wireless telecommunications network. This is shown, for example, in FIGS. 9 to 11, in which paging occasions belonging to the plurality PO1 are interleaved with paging occasions belonging to the plurality PO2.

In one example, the controller is operable to control the transceiver to receive a signal from the wireless telecommunications network indicative of the predetermined plurality of separate time periods. In this case, for example, information indicative of the predetermined plurality of separate time periods (in other words, the segmentation pattern of the repeatedly transmitted scheduling signal) is stored in the storage medium 422 of the infrastructure equipment 101 and is signalled to the terminal device 104 using the transceiver 411, 412. The transceiver 401, 402 of the terminal device then receives the signal and the information indicative of the predetermined plurality of separate time periods is stored in the storage medium 420.

In one example, the number of other terminal devices of the wireless telecommunications network with which a plurality of periodic paging occasions is associated is one or more, and the plurality of periodic paging occasions associated with the one or more other terminal devices is different to the plurality of periodic paging occasions associated with the terminal device. In this case, for example, there are at least two terminal devices in the wireless telecommunications network, wherein one terminal device is associated with the plurality of periodic paging occasions PO1 and the other terminal device is associated with the plurality of periodic paging occasions PO2, as shown in FIGS. 9 to 11. In another example, there may be no other terminal devices associated with a plurality of different periodic paging occasions (in which case, the only paging occasions present are those associated with the terminal device 104). It is noted that the present technique will still work in this case, in that if the terminal device knows the predetermined plurality of separate time periods over which the scheduling signal is repeatedly transmitted, the terminal device will know which paging occasion a particular set of repeats of the scheduling signal belongs to (thus avoiding the confusion arising from the situation shown in FIG. 8, for example).

In this second embodiment, the present technique also provides infrastructure equipment 101 for use with a wireless telecommunications network. The infrastructure equipment comprises a transceiver 411, 412 and a controller 413. The controller is operable to control the transceiver to begin transmitting, during the one of the plurality of periodic paging occasions associated with a terminal device 104, the scheduling signal scheduling the paging message for paging the terminal device in the way as described.

Figure 12:
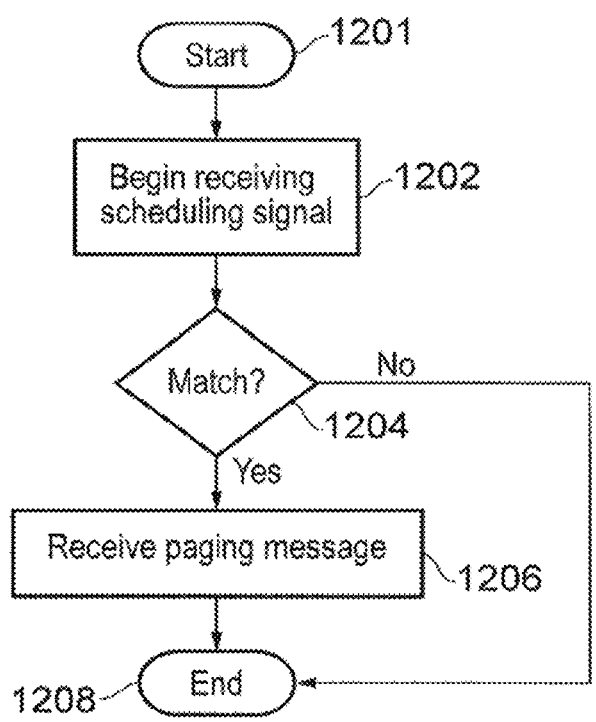
FIG. 12 illustrates a flow chart schematically showing a first method.

FIG. 12 illustrates a flow chart schematically showing a method according to the first embodiment of the present technique. The method starts at step 1201. At step 1202, the terminal device 104 begins receiving a scheduling signal during one of a plurality of periodic paging occasions associated with the terminal device. At step 1204, it is determined whether a value of a predetermined characteristic associated with each of the received scheduling signal and the one of the plurality of paging occasions matches. In the case that there is no match, the method ends at step 1208.

On the other hand, in the case that there is a match, the method moves on to step 1206, in which the terminal device receives a paging message scheduled by the scheduling signal. The method then ends at step 1208.

Figure 13:
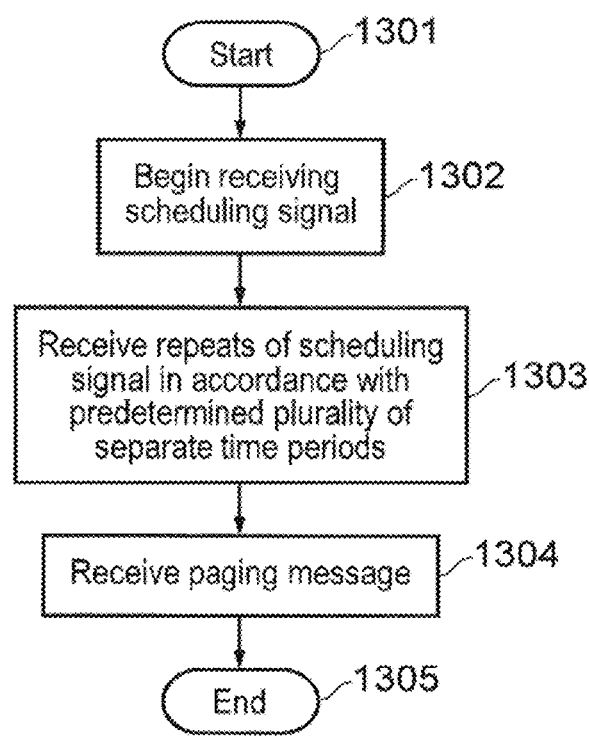
FIG. 13 illustrates a flow chart schematically showing a second method.

FIG. 13 illustrates a flow chart schematically showing a method according to the second embodiment of the present technique. The method starts at step 1301. At step 1302, the terminal device 104 begins receiving a scheduling signal during one of a plurality of periodic paging occasions associated with the terminal device. At step 1303, the terminal device receives a predetermined number of repeats of the scheduling signal over a predetermined plurality of separate time periods. At step 1304, the terminal device receives a paging message scheduled by the scheduling signal. The method then ends at step 1305.

Features of various embodiments of the present technique are described by the following numbered clauses:

1. A terminal device for use with a wireless telecommunications network, the terminal device comprising:
   a transceiver; and
   a controller operable:
   to control the transceiver to begin receiving, during one of a plurality of periodic paging occasions associated with the terminal device, a scheduling signal scheduling a paging message for paging one or more terminal devices of the wireless telecommunications network, each periodic paging occasion associated with the terminal device being associated with a value of a characteristic of the scheduling signal which is different from a value of the characteristic of the scheduling signal associated with one or more of each of the other periodic paging occasions associated with the terminal device and each of periodic paging occasions associated with one or more other terminal devices of the wireless telecommunications network;
   to determine whether the value of the characteristic of the received scheduling signal matches the value of the characteristic of the scheduling signal associated with the one of the plurality of periodic paging occasions associated with the terminal device; and
   if the value of the characteristic of the received scheduling signal matches the value of the characteristic of the scheduling signal associated with the one of the plurality of periodic paging occasions associated with the terminal device, to control the transceiver to receive the paging message scheduled by the received scheduling message.

2. A terminal device according to clause 1, wherein the characteristic of the scheduling signal is a paging occasion identifier identified by the scheduling signal.

3. A terminal device according to clause 2, wherein all periodic paging occasions associated with the terminal device are associated with the same identifier of the scheduling signal.

4. A terminal device according to clause 2, wherein each periodic paging occasion associated with the terminal device is associated with an identifier of the scheduling signal which is different from the identifier of the scheduling signal associated with each of the other periodic paging occasions associated with the terminal device.

5. A terminal device according to clause 1, wherein the characteristic of the scheduling signal is a scrambling of the scheduling signal.

6. A terminal device according to clause 5, wherein all periodic paging occasions associated with the terminal device are associated with the same scrambling of the scheduling signal.

7. A terminal device according to clause 5, wherein each periodic paging occasion associated with the terminal device is associated with a scrambling of the scheduling signal which is different from the scrambling of the scheduling signal associated with each of the other periodic paging occasions associated with the terminal device.

8. A terminal device according to any preceding clause, wherein the scheduling signal is transmitted using a candidate of a radio search space, the radio search space being defined by a plurality of candidates and each candidate of the radio search space being defined by a set of time and/or frequency radio resources for use in repeatedly transmitting the scheduling signal a number of times associated with that candidate, and wherein the controller is operable to control the transceiver to attempt to receive the scheduling signal from each candidate of the radio search space.

9. A terminal device according to clause 1, wherein the scheduling signal is transmitted using a candidate of a radio search space, the radio search space being defined by a plurality of candidates and each candidate of the radio search space being defined by a set of time and/or frequency radio resources for use in repeatedly transmitting the scheduling signal a number of times associated with that candidate, and wherein the controller is operable to control the transceiver to attempt to receive the scheduling signal from each candidate of the radio search space, wherein the characteristic of the scheduling signal is a starting time of the radio search space indicated by the scheduling signal, and the controller is operable to determine, on the basis of the starting time of the radio search space and a starting time of the scheduling signal, whether the scheduling signal belongs to a radio search space with a starting time which matches the starting time of the one of the plurality of periodic paging occasions associated with the terminal device, wherein the controller determines a match when the scheduling signal is determined to belong to a radio search space with a starting time which matches the starting time of the one of the plurality of periodic paging occasions associated with the terminal device.

10. A terminal device according to any preceding clause, wherein the terminal device is a Narrow Band Internet of Things (NB-IoT) terminal device and the scheduling signal is carried by a Narrow Band Physical Downlink Control Channel (NB-PDCCH).

11. Infrastructure equipment for use with a wireless telecommunications network, the infrastructure equipment comprising:
   a transceiver; and
   a controller operable:
   to control the transceiver to begin transmitting, during one of a plurality of periodic paging occasions associated with a terminal device of the wireless telecommunications network, a scheduling signal scheduling a paging message for paging the terminal device, wherein a value of a characteristic of the scheduling signal is associated with the one of the plurality of periodic paging occasions associated with the terminal device, each periodic paging occasion associated with the terminal device being associated with a value of the characteristic of the scheduling signal which is different from a value of the characteristic of the scheduling signal associated with one or more of each of the other periodic paging occasions associated with the terminal device and each of periodic paging occasions associated with one or more other terminal devices of the wireless telecommunications network.

12. Infrastructure equipment according to clause 11, wherein the characteristic of the scheduling signal is a paging occasion identifier identified by the scheduling signal.

13. Infrastructure equipment according to clause 12, wherein all periodic paging occasions associated with the terminal device are associated with the same identifier of the scheduling signal.

14. Infrastructure equipment according to clause 12, wherein each periodic paging occasion associated with the terminal device is associated with an identifier of the scheduling signal which is different from the identifier of the scheduling signal associated with each of the other periodic paging occasions associated with the terminal device.

15. Infrastructure equipment according to clause 11, wherein the characteristic of the scheduling signal is a scrambling of the scheduling signal.

16. Infrastructure equipment according to clause 15, wherein all periodic paging occasions associated with the terminal device are associated with the same scrambling of the scheduling signal.

17. Infrastructure equipment according to clause 15, wherein each periodic paging occasion associated with the terminal device is associated with a scrambling of the scheduling signal which is different from the scrambling of the scheduling signal associated with each of the other periodic paging occasions associated with the terminal device.

18. Infrastructure equipment according to any one of clauses 11 to 17, wherein the scheduling signal is transmitted using a candidate of a radio search space, the radio search space being defined by a plurality of candidates and each candidate of the radio search space being defined by a set of time and/or frequency radio resources for use in repeatedly transmitting the scheduling signal a number of times associated with that candidate.

19. Infrastructure equipment according to clause 11, wherein the scheduling signal is transmitted using a candidate of a radio search space, the radio search space being defined by a plurality of candidates and each candidate of the radio search space being defined by a set of time and/or frequency radio resources for use in repeatedly transmitting the scheduling signal a number of times associated with that candidate, wherein the characteristic of the scheduling signal is a starting time of the radio search space indicated by the scheduling signal, the starting time of the radio search space matching the starting time of the one of the plurality of periodic paging occasions associated with the terminal device.

20. Infrastructure equipment according to any one of clauses 11 to 19, wherein the terminal device is a Narrow Band Internet of Things (NB-IoT) terminal device and the scheduling signal is carried by a Narrow Band Physical Downlink Control Channel (NB-PDCCH).

21. A method of operating a terminal device for use with a wireless telecommunications network, the method comprising:
   controlling a transceiver of the terminal device to begin receiving, during one of a plurality of periodic paging occasions associated with the terminal device, a scheduling signal scheduling a paging message for paging one or more terminal devices of the wireless telecommunications network, each periodic paging occasion associated with the terminal device being associated with a value of a characteristic of the scheduling signal which is different from a value of the characteristic of the scheduling signal associated with one or more of each of the other periodic paging occasions associated with the terminal device and each of periodic paging occasions associated with one or more other terminal devices of the wireless telecommunications network;

determining whether the value of the characteristic of the received scheduling signal matches the value of the characteristic of the scheduling signal associated with the one of the plurality of periodic paging occasions associated with the terminal device; and if the value of the characteristic of the received scheduling signal matches the value of the characteristic of the scheduling signal associated with the one of the plurality of periodic paging occasions associated with the terminal device, controlling the transceiver to receive the paging message scheduled by the received scheduling message.

22. A method of operating infrastructure equipment for use with a wireless telecommunications network, the method comprising:

controlling a transceiver of the infrastructure equipment to begin transmitting, during one of a plurality of periodic paging occasions associated with a terminal device of the wireless telecommunications network, a scheduling signal scheduling a paging message for paging the terminal device, wherein a value of a characteristic of the scheduling signal is associated with the one of the plurality of periodic paging occasions associated with the terminal device, each periodic paging occasion associated with the terminal device being associated with a value of the characteristic of the scheduling signal which is different from a value of the characteristic of the scheduling signal associated with one or more of each of the other periodic paging occasions associated with the terminal device and each of periodic paging occasions associated with one or more other terminal devices of the wireless telecommunications network.

23. Integrated circuitry for a terminal device for use with a wireless telecommunications network, the integrated circuitry comprising:

a transceiver element; and a controller element operable:

to control the transceiver element to begin receiving, during one of a plurality of periodic paging occasions associated with the terminal device, a scheduling signal scheduling a paging message for paging one or more terminal devices of the wireless telecommunications network, each periodic paging occasion associated with the terminal device being associated with a value of a characteristic of the scheduling signal which is different from a value of the characteristic of the scheduling signal associated with one or more of each of the other periodic paging occasions associated with the terminal device and each of periodic paging occasions associated with one or more other terminal devices of the wireless telecommunications network;

to determine whether the value of the characteristic of the received scheduling signal matches the value of the characteristic of the scheduling signal associated with the one of the plurality of periodic paging occasions associated with the terminal device; and if the value of the characteristic of the received scheduling signal matches the value of the characteristic of the scheduling signal associated with the one of the plurality of periodic paging occasions associated with the terminal device, to control the transceiver element to receive the paging message scheduled by the received scheduling message.

24. Integrated circuitry for infrastructure equipment for use with a wireless telecommunications network, the integrated circuitry comprising:

a transceiver element; and a controller element operable:

to control the transceiver element to begin transmitting, during one of a plurality of periodic paging occasions associated with a terminal device of the wireless telecommunications network, a scheduling signal scheduling a paging message for paging the terminal device, wherein a value of a characteristic of the scheduling signal is associated with the one of the plurality of periodic paging occasions associated with the terminal device, each periodic paging occasion associated with the terminal device being associated with a value of the characteristic of the scheduling signal which is different from a value of the characteristic of the scheduling signal associated with one or more of each of the other periodic paging occasions associated with the terminal device and each of periodic paging occasions associated with one or more other terminal devices of the wireless telecommunications network.

25. A wireless telecommunications network comprising a terminal device according to clause 1 and infrastructure equipment according to clause 11.

26. A terminal device for use with a wireless telecommunications network, the terminal device comprising:

a transceiver; and a controller operable:

to control the transceiver to begin receiving, during one of a plurality of periodic paging occasions associated with the terminal device, a scheduling signal scheduling a paging message for paging the terminal device; wherein the scheduling signal is repeatedly transmitted by the network a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver is controlled to begin receiving the scheduling signal; and the controller is operable to control the transceiver to receive the repetitions of the scheduling signal over the predetermined plurality of separate time periods.

27. A terminal device according to clause 26, wherein the total time taken for the scheduling signal to be repeatedly transmitted by the network is greater than the time period between consecutive periodic paging occasions associated with the terminal device and with any other terminal device of the wireless telecommunications network with which a plurality of periodic paging occasions is associated.

28. A terminal device according to clause 26 or 27, wherein the plurality of periodic paging occasions associated with the terminal device are interleaved with the plurality of periodic paging occasions associated with any other terminal device of the wireless telecommunications network.

29. A terminal device according to any one of clauses 26 to 28, wherein the controller is operable to control the transceiver to receive a signal from the wireless telecommunications network indicative of the predetermined plurality of separate time periods.

30. A terminal device according to any one of clauses 26 to 29, wherein the number of other terminal devices of the wireless telecommunications network with which a plurality of periodic paging occasions is associated is one or more, and the plurality of periodic paging occasions associated with the one or more other terminal devices is different to the plurality of periodic paging occasions associated with the terminal device.

31. A terminal device according to any one of clauses 26 to 30, wherein the scheduling signal is transmitted using a candidate of a radio search space, the radio search space being defined by a plurality of candidates and each candidate of the radio search space being defined by a set of time and/or frequency radio resources for use in repeatedly transmitting the scheduling signal a number of times associated with that candidate, and wherein the controller is operable to control the transceiver to attempt to receive the scheduling signal from each candidate of the radio search space.

32. A terminal device according to any one of clauses 26 to 31, wherein the terminal device is a Narrow Band Internet of Things (NB-IoT) terminal device and the scheduling signal is carried by a Narrow Band Physical Downlink Control Channel (NB-PDCCH).

33. Infrastructure equipment for use with a wireless telecommunications network, the infrastructure equipment comprising:
    a transceiver; and
    a controller operable:
        to control the transceiver to begin transmitting, during one of a plurality of periodic paging occasions associated with a terminal device of the wireless telecommunications network, a scheduling signal scheduling a paging message for paging the terminal device; wherein
        the controller is operable to control the transceiver to repeatedly transmit the scheduling signal a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver is controlled to begin transmitting the scheduling signal.

34. Infrastructure equipment according to clause 33, wherein the total time taken for the scheduling signal to be repeatedly transmitted by the transceiver is greater than the time period between consecutive periodic paging occasions associated with the terminal device and with any other terminal device of the wireless telecommunications network with which a plurality of periodic paging occasions is associated.

35. Infrastructure equipment according to clause 33 or 34, wherein the plurality of periodic paging occasions associated with the terminal device are interleaved with the plurality of periodic paging occasions associated with any other terminal device of the wireless telecommunications network.

36. Infrastructure equipment according to any one of claims 33 to 35, wherein the controller is operable to control the transceiver to transmit a signal to the terminal device indicative of the predetermined plurality of separate time periods.

37. Infrastructure equipment according to any one of clauses 33 to 36, wherein the number of other terminal devices of the wireless telecommunications network with which a plurality of periodic paging occasions is associated is one or more, and the plurality of periodic paging occasions associated with the one or more other terminal devices is different to the plurality of periodic paging occasions associated with the terminal device.

38. Infrastructure equipment according to any one of clauses 33 to 37, wherein the scheduling signal is transmitted using a candidate of a radio search space, the radio search space being defined by a plurality of candidates and each candidate of the radio search space being defined by a set of time and/or frequency radio resources for use in repeatedly transmitting the scheduling signal a number of times associated with that candidate.

39. Infrastructure equipment according to any one of clauses 33 to 38, wherein the terminal device is a Narrow Band Internet of Things (NB-IoT) terminal device and the scheduling signal is carried by a Narrow Band Physical Downlink Control Channel (NB-PDCCH).

40. A method of operating a terminal device for use with a wireless telecommunications network, the method comprising:
    controlling a transceiver of the terminal device to begin receiving, during one of a plurality of periodic paging occasions associated with the terminal device, a scheduling signal scheduling a paging message for paging the terminal device; wherein
    the scheduling signal is repeatedly transmitted by the network a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver is controlled to begin receiving the scheduling signal; and
    transceiver is controlled to receive the repetitions of the scheduling signal over the predetermined plurality of separate time periods.

41. A method of operating infrastructure equipment for use with a wireless telecommunications network, the method comprising:
    controlling a transceiver of the infrastructure equipment to begin transmitting, during one of a plurality of periodic paging occasions associated with a terminal device of the wireless telecommunications network, a scheduling signal scheduling a paging message for paging the terminal device; wherein
    the transceiver is controlled to repeatedly transmit the scheduling signal a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver is controlled to begin transmitting the scheduling signal.

42. Integrated circuitry for a terminal device for use with a wireless telecommunications network, the integrated circuitry comprising:
    a transceiver element; and
    a controller element operable:
        to control the transceiver element to begin receiving, during one of a plurality of periodic paging occasions associated with the terminal device, a scheduling signal scheduling a paging message for paging the terminal device; wherein the scheduling signal is repeatedly transmitted by the network a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver element is controlled to begin receiving the scheduling signal; and the controller element is operable to control the transceiver element to receive the repetitions of the scheduling signal over the predetermined plurality of separate time periods.

43. Integrated circuitry for operating infrastructure equipment for use with a wireless telecommunications network, the integrated circuitry comprising:

a transceiver element; and a controller element operable:

to control the transceiver element to begin transmitting, during one of a plurality of periodic paging occasions associated with a terminal device of the wireless telecommunications network, a scheduling signal scheduling a paging message for paging the terminal device; wherein the controller element is operable to control the transceiver to repeatedly transmit the scheduling signal a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver element is controlled to begin transmitting the scheduling signal.

44. A wireless telecommunications network comprising a terminal device according to clause 26 and infrastructure equipment according to clause 33.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments. Described embodiments may be implemented in any suitable form including hardware, software, firmware or any combination of these. Described embodiments may optionally be implemented at least partly as computer software miming on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

ANNEX 1

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signalling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69
[3] R1-157783, "Way Forward on NB-IoT," CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Jio, CATT, u-blox, China Unicom, LG Electronics, Panasonic, Alcatel-Lucent, Alcatel-Lucent Shanghai Bell, China Telecom, RAN1 #83

The invention claimed is:

1. A terminal device for use with a wireless telecommunications network, the terminal device comprising:
a transceiver; and
a controller operable:
to control the transceiver to begin receiving, during one of a plurality of periodic paging occasions associated with the terminal device, a scheduling signal scheduling a paging message for paging the terminal device; wherein
the scheduling signal is repeatedly transmitted by the network a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver is controlled to begin receiving the scheduling signal; and the controller is operable to control the transceiver to receive the repetitions of the scheduling signal over the predetermined plurality of separate time periods.

2. A terminal device according to claim 1, wherein the total time taken for the scheduling signal to be repeatedly transmitted by the network is greater than the time period between consecutive periodic paging occasions associated with the terminal device and with any other terminal device of the wireless telecommunications network with which a plurality of periodic paging occasions is associated.

3. A terminal device according to claim 1, wherein the plurality of periodic paging occasions associated with the terminal device are interleaved with the plurality of periodic paging occasions associated with any other terminal device of the wireless telecommunications network.

4. A terminal device according to claim 1, wherein the controller is operable to control the transceiver to receive a signal from the wireless telecommunications network indicative of the predetermined plurality of separate time periods.

5. A terminal device according to claim 1, wherein the number of other terminal devices of the wireless telecommunications network with which a plurality of periodic paging occasions is associated is one or more, and the plurality of periodic paging occasions associated with the one or more other terminal devices is different to the plurality of periodic paging occasions associated with the terminal device.

6. A terminal device according to claim 1, wherein the scheduling signal is transmitted using a candidate of a radio search space, the radio search space being defined by a plurality of candidates and each candidate of the radio search space being defined by a set of time and/or frequency radio resources for use in repeatedly transmitting the scheduling signal a number of times associated with that candidate, and wherein the controller is operable to control the transceiver to attempt to receive the scheduling signal from each candidate of the radio search space.

7. A terminal device according to claim 1, wherein the terminal device is a Narrow Band Internet of Things (NB-IoT) terminal device and the scheduling signal is carried by a Narrow Band Physical Downlink Control Channel (NB-PDCCH).

8. Infrastructure equipment for use with a wireless telecommunications network, the infrastructure equipment comprising:

a transceiver; and a controller operable:

to control the transceiver to begin transmitting, during one of a plurality of periodic paging occasions associated with a terminal device of the wireless telecommunications network, a scheduling signal scheduling a paging message for paging the terminal device; wherein the controller is operable to control the transceiver to repeatedly transmit the scheduling signal a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver is controlled to begin transmitting the scheduling signal.

9. Infrastructure equipment according to claim 8, wherein the total time taken for the scheduling signal to be repeatedly transmitted by the transceiver is greater than the time period between consecutive periodic paging occasions associated with the terminal device and with any other terminal device of the wireless telecommunications network with which a plurality of periodic paging occasions is associated.

10. Infrastructure equipment according to claim 8, wherein the plurality of periodic paging occasions associated with the terminal device are interleaved with the plurality of periodic paging occasions associated with any other terminal device of the wireless telecommunications network.

11. Infrastructure equipment according to claim 8, wherein the controller is operable to control the transceiver to transmit a signal to the terminal device indicative of the predetermined plurality of separate time periods.

12. Infrastructure equipment according to claim 8, wherein the number of other terminal devices of the wireless telecommunications network with which a plurality of periodic paging occasions is associated is one or more, and the plurality of periodic paging occasions associated with the one or more other terminal devices is different to the plurality of periodic paging occasions associated with the terminal device.

13. Infrastructure equipment according to claim 8, wherein the scheduling signal is transmitted using a candidate of a radio search space, the radio search space being defined by a plurality of candidates and each candidate of the radio search space being defined by a set of time and/or frequency radio resources for use in repeatedly transmitting the scheduling signal a number of times associated with that candidate.

14. Infrastructure equipment according to claim 8, wherein the terminal device is a Narrow Band Internet of Things (NB-IoT) terminal device and the scheduling signal is carried by a Narrow Band Physical Downlink Control Channel (NB-PDCCH).

15. A method of operating infrastructure equipment for use with a wireless telecommunications network, the method comprising:

controlling a transceiver of the infrastructure equipment to begin transmitting, during one of a plurality of periodic paging occasions associated with a terminal device of the wireless telecommunications network, a scheduling signal scheduling a paging message for paging the terminal device; wherein the transceiver is controlled to repeatedly transmit the scheduling signal a predetermined number of times over a predetermined plurality of separate time periods, each of the separate time periods having a duration less than or equal to a time period between consecutive periodic paging occasions associated with the terminal device and with any other terminal device of the wireless telecommunications network with which a plurality of periodic paging occasions is associated, and one of the separate time periods being during a periodic paging occasion or between periodic paging occasions other than the one of the plurality of periodic paging occasions during which the transceiver is controlled to begin transmitting the scheduling signal.

\* \* \* \* \*